(12) United States Patent
Ryu et al.

(10) Patent No.: US 9,244,573 B2
(45) Date of Patent: Jan. 26, 2016

(54) CAPACITIVE TOUCH PANEL INCLUDING EMBEDDED SENSING ELECTRODES

(75) Inventors: Sung Jin Ryu, Cheongju-si (KR); Hyung Bae Choi, Mungyeong-si (KR); Ki Won Park, Anyang-si (KR); Jong Wook Huh, Anseong-si (KR)

(73) Assignee: MIRAENANOTECH CO., LTD., Cheongwon-Gun (KR)

( * ) Notice: Subject to any disclaimer, the term of this patent is extended or adjusted under 35 U.S.C. 154(b) by 480 days.

(21) Appl. No.: 13/582,410

(22) PCT Filed: Mar. 3, 2011

(86) PCT No.: PCT/KR2011/001478
§ 371 (c)(1),
(2), (4) Date: Aug. 31, 2012

(87) PCT Pub. No.: WO2011/108869
PCT Pub. Date: Sep. 9, 2011

(65) Prior Publication Data
US 2012/0327021 A1 Dec. 27, 2012

(30) Foreign Application Priority Data

Mar. 3, 2010 (KR) .................. 10-2010-0019102
Aug. 9, 2010 (KR) .................. 10-2010-0076269

(51) Int. Cl.
*H01L 29/84* (2006.01)
*G06F 3/044* (2006.01)

(52) U.S. Cl.
CPC ...... *G06F 3/044* (2013.01); *G06F 2203/04103* (2013.01); *G06F 2203/04111* (2013.01)

(58) Field of Classification Search
CPC ............ G06F 2203/04103; G06F 2203/04111; G06F 3/044
USPC ............................ 257/415; 438/50; 345/174
See application file for complete search history.

(56) References Cited

U.S. PATENT DOCUMENTS

2009/0255737 A1* 10/2009 Chang et al. ............... 178/18.06
2010/0026659 A1* 2/2010 Long et al. ................. 345/174

(Continued)

FOREIGN PATENT DOCUMENTS

| JP | H11-260271 A | 9/1999 |
| JP | 2005-005721 A | 1/2005 |

(Continued)

OTHER PUBLICATIONS

International Search Report for PCT/KR2011/001478 filed on Mar. 3, 2011.

*Primary Examiner* — Duy T Nguyen

(57) ABSTRACT

The present invention relates to a capacitive touch panel and a method for manufacturing the same, in which the material having lower resistance than that of ITO is filled in the intaglio formed on the resin layer, which is patterned to form the embedded sensing electrode and the sensing electrodes and the wiring electrodes are formed at the same time by using the same resistance material; in which the capacitive touch panel includes a first sensing layer formed with a plurality of first direction sensing electrodes, which are patterned and a plurality of first wiring electrodes; and a second sensing layer formed with a plurality of second direction sensing electrodes, which are patterned and a plurality of second wiring electrodes; in which the first sensing layer and the second sensing layer are bonded in the mutual vertical direction.

16 Claims, 14 Drawing Sheets

(56) References Cited

U.S. PATENT DOCUMENTS

| | | | |
|---|---|---|---|
| 2010/0045625 A1* | 2/2010 | Yang et al. | 345/173 |
| 2010/0231531 A1* | 9/2010 | Yang | G06F 3/044 345/173 |
| 2010/0295819 A1* | 11/2010 | Ozeki | G06F 3/044 345/174 |

FOREIGN PATENT DOCUMENTS

| | | |
|---|---|---|
| JP | 2007-257164 A | 10/2007 |
| JP | 2008-218191 A | 9/2008 |
| JP | 2010-039537 A | 2/2010 |
| JP | 2011-018194 A | 1/2011 |
| KR | 10-2009-0015414 A | 2/2009 |
| KR | 10-2009-0019881 A | 2/2009 |
| KR | 1020090015414 * | 2/2009 |
| KR | 10-2009-0095930 A | 9/2009 |
| KR | 1020090095930 * | 9/2009 |
| KR | 10-2010-0007717 A | 1/2010 |
| WO | WO 2009/145485 A2 | 12/2009 |

* cited by examiner (ITO pattern – ground plan)

(ITO pattern – cross section)

Second direction sensing electrode line

First direction sensing electrode line

CAPACITIVE TOUCH PANEL INCLUDING EMBEDDED SENSING ELECTRODES

CROSS-REFERENCE TO RELATED APPLICATIONS

This application claims priority to and the benefit of Korean Patent Application No. 10-2010-0019102 and 10-2010-0076269 filed in the Korean Intellectual Property Office on Mar. 3, 2010 and Aug. 9, 2010, the entire contents of which are incorporated herein by reference. This application claims priority to and the benefit of PCT No. PCT/KR2011/001478 filed on Mar. 3, 2011, the entire contents of which are incorporated herein by reference.

TECHNICAL FIELD

The present invention relates to a touch panel, and more specifically, to a capacitive touch panel and a method for manufacturing the same.

BACKGROUND ART

A touch screen device means an input unit for performing the whole control of an electronic device; comprising controlling a display screen by sensing a touch point of user on the display screen and then using the information about the sensible touch point as input information.

The touch screen device uses a touch screen, such as a resistive touch screen, a capacitive touch screen, an ultrasonic touch screen, an optical (infrared) sensor touch screen, an electron inducing touch screen, and the like. They have different characteristics, such as signal amplification, a resolution, the level of difficulty of plan and process technology, and the like, according to each way. Therefore, the touch screen device has to reflect and select enough to be able to emphasize each way's advantage.

For specifically selecting a way, durability, an economic feasibility, and the like should be considered in addition to an optical property, a technical property, and an input property. Two representative ways from among these are the resistive way and the capacitive way. From among these, the capacitive touch screen that is applied to Mobile, MP2 device, Note Book, and the like, generally uses ITO (Indume Tin Oxide) transparency electrode.

FIG. 1a is a cross-sectional view of a touch panel including ITO material according to the prior art; FIG. 1b and FIG. 1c are processes for manufacturing a touch panel including ITO material according to the prior art, which are flow charts of a photo etching process and a screen printing process, respectively.

Referring to FIG. 1a, the touch screen using the capacitive way according to the prior art has poor touch sensitivity because sensing and motion sensors are formed by patterning ITO transparency electrode, so that it is not suitable for making a large area. In addition, an optical transmittance is not good and also visibility is bad due to the pattern of sensor electrode.

Referring to FIGS. 1b and 1c, the touch panel according to the prior art is manufactured by the photo etching process for forming a wiring and a pattern of ITO transparency electrode or a screen-printing process for forming a pattern of silver electrode.

In the case of the photo etching process, the process is complex and the cost of manufacturing is high due to a photolithography process. In the case of the screen-printing process, the process is difficult to accurately control so that it is difficult to maintain an accurate align tolerance between ITO and outer electrode part; a line width is difficult to finely implement so that there are many dead spaces; a crack may be generated on the ITO micro line width part due to the high-temperature drying; and the cost of ITO material is high so that the cost for manufacturing the touch screen and touch pad including ITO material is high.

DISCLOSURE

Technical Problem

Summary of the Invention

An object of the present invention is to provide a capacitive touch panel and a method for manufacturing the same, in which the capacitive touch panel has an intaglio micro pattern formed by imprinting process and a conductive layer formed in the intaglio. with low resistance as compared with ITO, and various fill factors.

Another object of the present invention is to provide a capacitive touch panel and a method for manufacturing the same, in which the capacitive touch panel is manufactured by forming a sensing electrode and a wiring electrode at the same time in the intaglio after processing the intaglio pattern on a resin layer laminated on a transparency substrate.

Technical Solution

In order to achieve the above objects, a capacitive touch panel according to an embodiment of the present invention includes a first sensing layer formed with a plurality of first direction sensing electrodes which are patterned and a plurality of first wiring electrodes; and a second sensing layer formed with a plurality of second direction sensing electrodes which are patterned and a plurality of second wiring electrodes, wherein the first sensing layer and the second sensing layer are mutually bonded in a vertical direction.

At least one of the first direction sensing electrodes and the second direction sensing electrodes may be formed in a plurality of first regions for sensing user's touch and a plurality of second regions for connecting the first regions.

At least one region of the plurality of the first regions and the plurality of the second regions may have edges surrounded by electrode.

At least one region of the plurality of the first regions and the plurality of the second regions may have open edges.

The plurality of the first regions may be formed in a plurality of lattic shaped electrodes inside the regions.

Preferably, the first region of the first sensing layer and the first region of the second sensing layer are mutually not overlapped in the vertical direction of the first and the second sensing layers.

Preferably, the second region of the first sensing layer and the second region of the second sensing layer are overlapped in the vertical direction of the first and the second sensing layers.

Each pattern of the second region of the first sensing layer and the second region of the second sensing layer may be formed in a different pattern from each pattern of the first region of the first sensing layer and the first region of the second sensing layer.

A pattern formed by overlapping in the vertical direction of the second region of the first sensing layer and the second region of the second sensing layer may be the same or similar with the pattern of the first region of the first sensing layer or the pattern of the first region of the second sensing layer.

Preferably, the touch panel further includes a bonding layer that is formed in an optically clear adhesive of a film type in between the first sensing layer and the second sensing layer.

Each of the first sensing layer and the second sensing layer includes a transparent substrate, and a resin layer laminated on the transparent substrate, wherein the resin layer has a patterned that is formed with patterned intaglio on a surface of the resin layer, the sensing electrode and the wiring electrode may be formed inside the intaglio at the same time.

A cross-section of the patterned layer may be formed in any one of shapes, such as a square, a triangle, and a trapezoid.

The patterned layer is formed in a plurality of the intaglio having width of 1 μm~10 μm, depth of 1 μm~10 μm, and pitch of 200 μm~600 μm in between the intaglio.

A seed layer of metal may be formed on the surface of the intaglio.

The seed layer may be formed with one of Cu, Ni, Cr, Fe, W, P, Co, Ag, Ag—C, Ni—P, CuO and $SiO_2$, or an alloy thereof.

The sensing electrode and the wiring electrode are preferably formed with the material having lower resistance than that of ITO (Indume Tin Oxide) on the seed layer.

The sensing electrode and the wiring electrode may be any one of Cu, Ag, Ag—C, Al, Ni, Cr, and Ni—P, or an alloy thereof.

The touch panel has optical transmittance of above 80% and a haze of less than 4%.

Each of the first and second wiring electrodes may be simultaneously formed in connection with each of the first and second direction sensing electrodes in a part of edges of each of the first and second sensing layers and in a wider width than that of each of the first and second direction sensing electrodes.

In order to achieve the above objects, a method for manufacturing a capacitive touch panel according to an embodiment of the present invention includes: forming a second sensing layer having second wiring electrodes and second sensing electrodes that are patterned in a second direction; and forming a first sensing layer having first wiring electrodes and first sensing electrodes that are patterned in a first direction, wherein the first sensing layer is bonded on an upper surface or a lower surface of the second sensing layer.

The method for manufacturing the touch panel may further include bonding of the second sensing layer and the first sensing layer when the first sensing layer and the second sensing layer are formed at the same time. The method for manufacturing the touch panel may further include forming a bonding layer that is a film type and an optically clear adhesive on the surface of the second sensing layer after forming the second sensing layer.

Each of the forming the first and second sensing layers may include: laminating a resin layer having a pattern of the sensing electrodes on a transparent substrate; forming an intaglio in the resin layer according to patterns that will be formed with the sensing electrodes and the wiring electrodes; and forming the sensing electrodes and the wiring electrodes in the intaglio at the same time.

For in the forming the intaglio, the intaglio may be formed by imprinting the resin layer.

After the forming the intaglio, a surface of the resin layer and an inner surface of the intaglio may be surface-treated.

A seed layer may be formed on the surface of the resin layer and the inner surface of the intaglio that are surface-treated.

Preferably, the seed layer formed on the surface of the resin layer is removed by etching after filling a resin in the intaglio, and then the resin filled is removed.

The metal layer having lower resistance than that of ITO (Indume Tin Oxide) is preferably formed on the seed layer formed on the intaglio surface.

After coating a conductive polymer or a metallic material inside the intaglio and on the surface of the resin layer, the conductive polymer or the metallic material remained on the surface of the resin layer except the intaglio may be removed using a blade.

at each of the forming the first and second sensing layers, each of the first and second wiring electrodes may be simultaneously formed in connection with each of the first and second direction sensing electrodes at a part of edges of each of the first and the second sensing layers and in a wider width than that of each of the first and second direction sensing electrodes.

Each of the first and second direction sensing electrodes may include a plurality of the first regions for sensing user's touch, and a plurality of the second regions for connecting a plurality of the first regions.

The first regions of the first and the second sensing layers may have the lattice pattern formed by a plurality of the electrodes.

The second regions of the first and second sensing layers may be formed in a different pattern from the first regions of the first and second sensing layers.

The patterns of the second regions of the first and second sensing layers, which are formed by overlapping in a vertical direction of the first and second sensing layers may be the same or similar with the pattern of the first region of the first sensing layer or the pattern of the first region of the second sensing layer.

DESCRIPTION OF DRAWINGS

The above and other objects, features and advantages of the present invention will become apparent from the following description of preferred embodiments given in conjunction with the accompanying drawings, in which:

FIG. 3 is a cross-sectional view along with a line A-A' of FIG. 2a.

FIG. 4 is a cross-sectional view along with a line B-B' of FIG. 2a.

BEST MODE

Hereinafter, the embodiments of the present invention will be described in detail with reference to accompanying drawings. First of all, for adding a reference mark to component parts in each of figures, it must be given attention to have same marks, if possible, for the same component part, even if marking in other figures. In addition, for describing the present invention, when it is considered that the specific descriptions about the relevant known constitutions or functions may hurt the point of the present invention, the detailed descriptions will be omitted, and the terms that are in the singular may include a pluralized concept. In addition, hereinafter, the preferable embodiments of the present invention will be described, but the technical spirit of the present invention is not limited thereto and of course, may be performed by variously modifying by the person who has a skill in the art without the limitation.

Figure 1A:
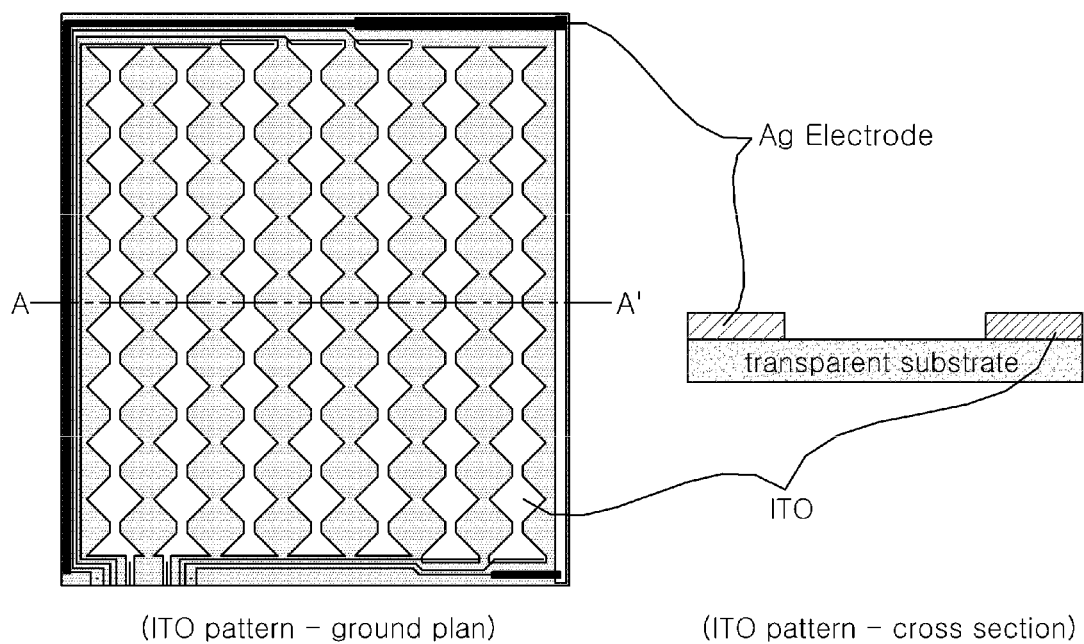
FIG. 1a is a cross-sectional view of a touch panel including ITO material according to the prior art.
Figure 1B:
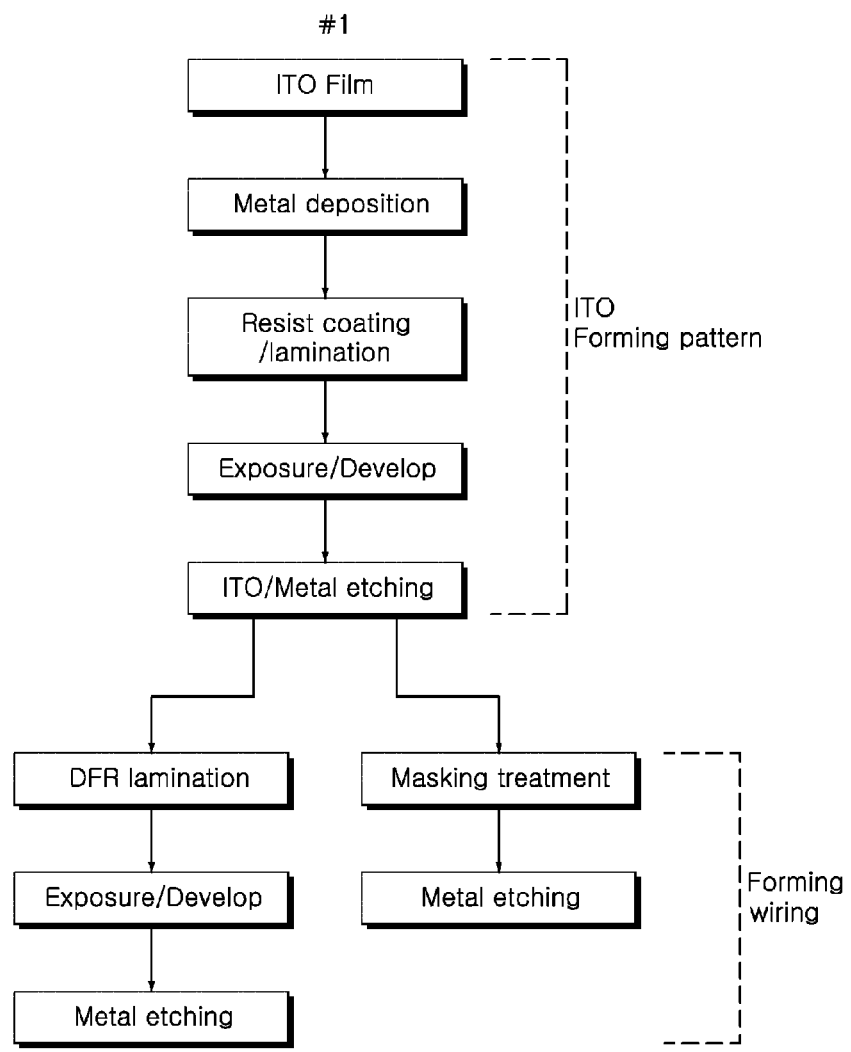
FIG. 1b and FIG. 1c are flow charts of a photo etching process and a screen printing process for manufacturing a touch panel including ITO material according to the prior art, respectively.
Figure 1C:
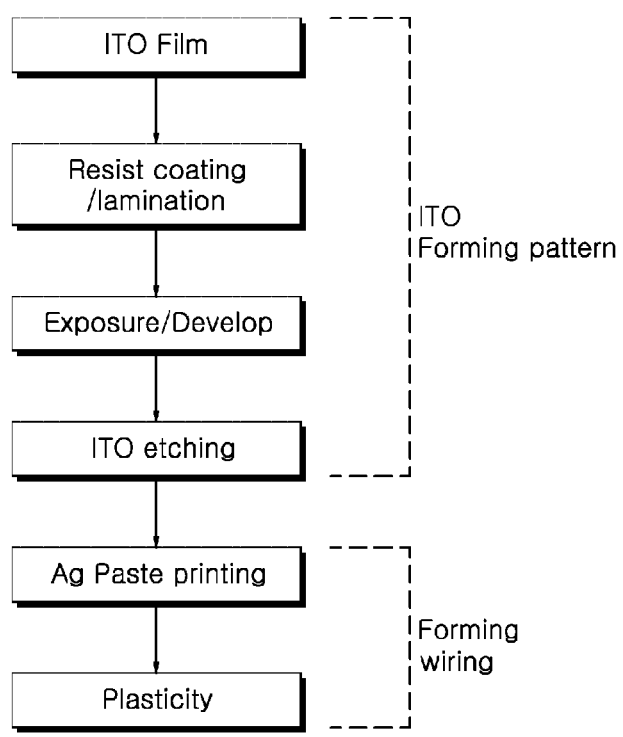
Figure 2A:
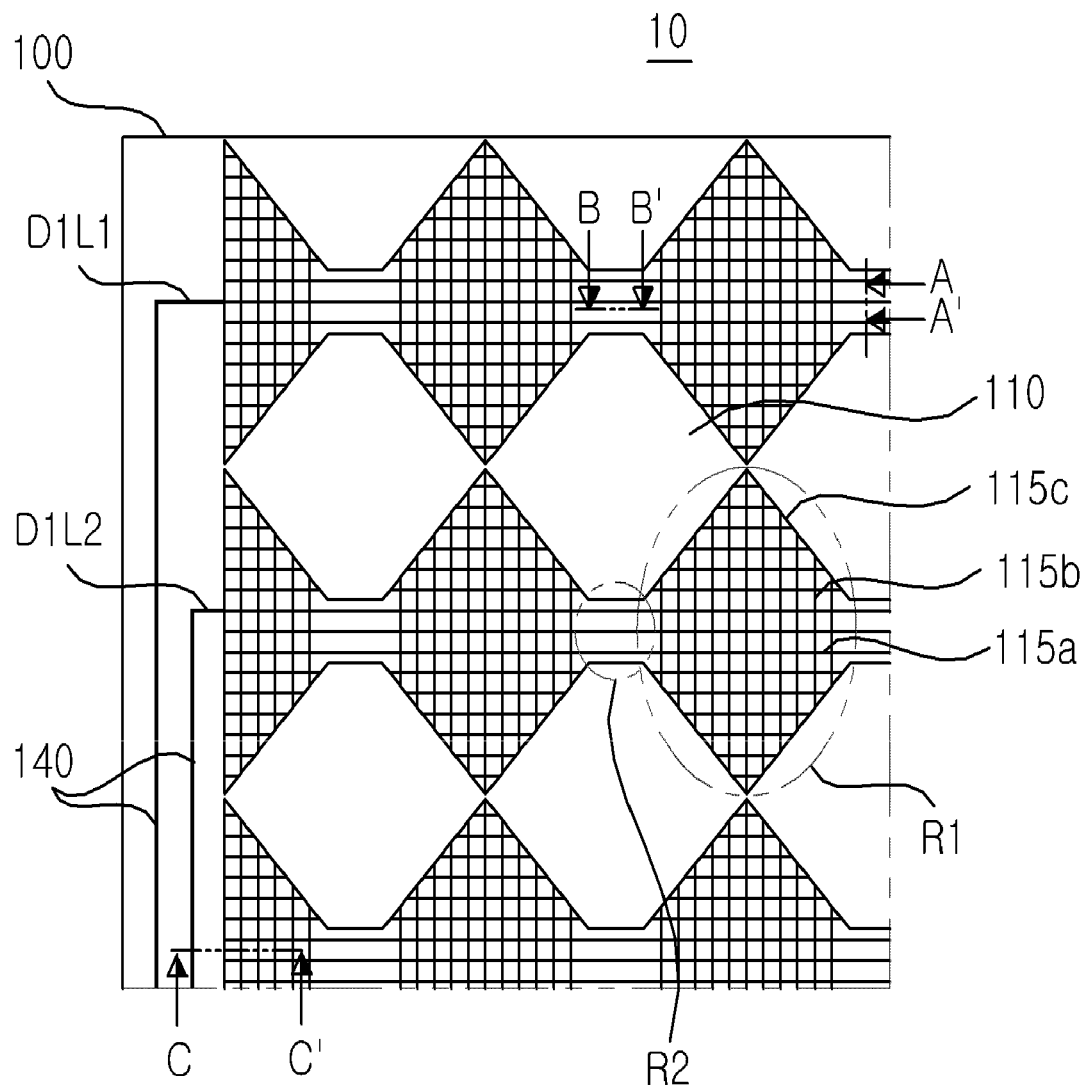
FIG. 2a and FIG. 2b are plan views of a first sensing layer including a x-axis sensing electrode of an upper layer of a touch panel according to an embodiment of the present invention and of a second sensing layer including a y-axis sensing electrode of a lower layer of the touch panel, respectively.
Figure 2B:
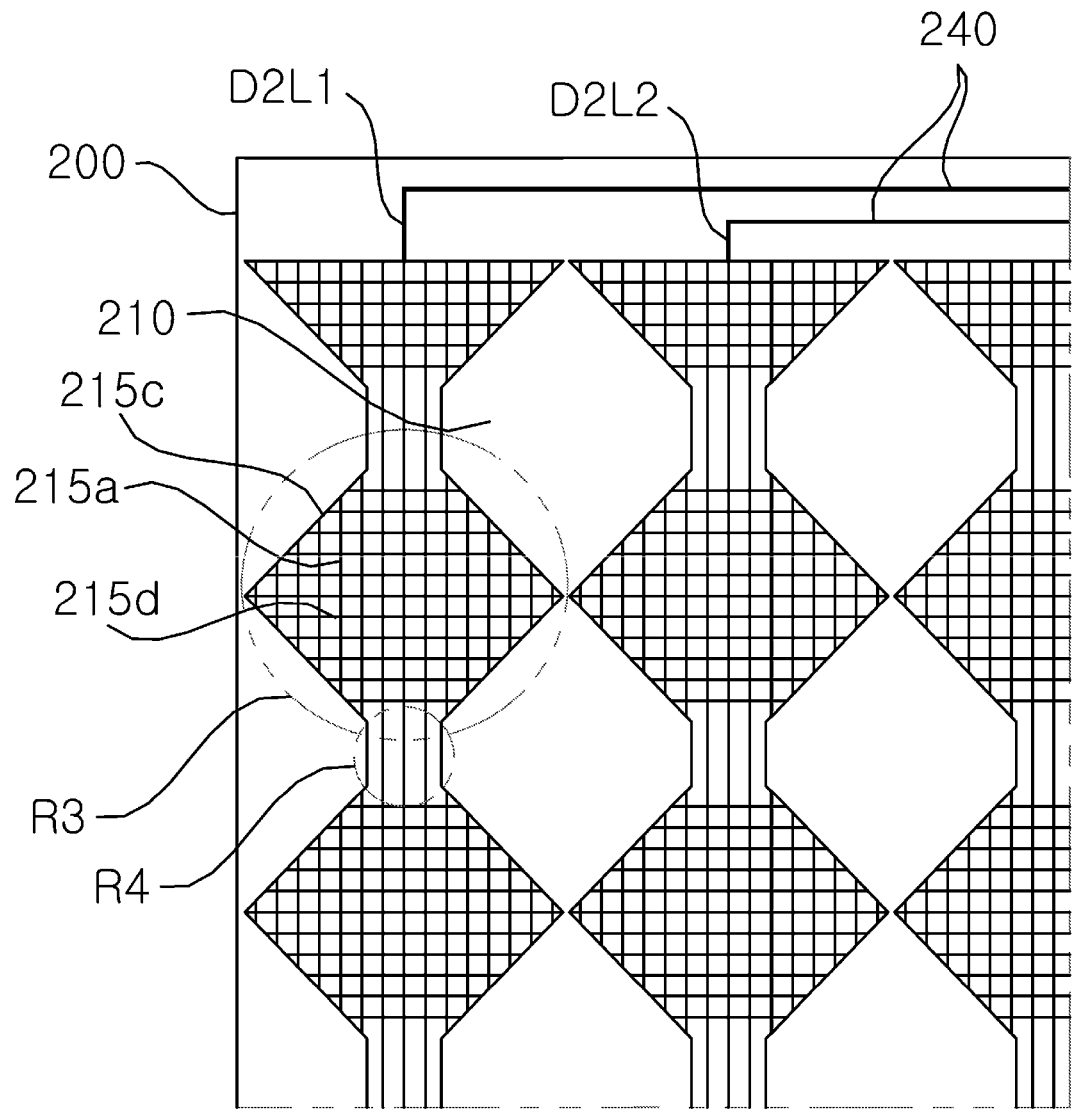
Figure 3:
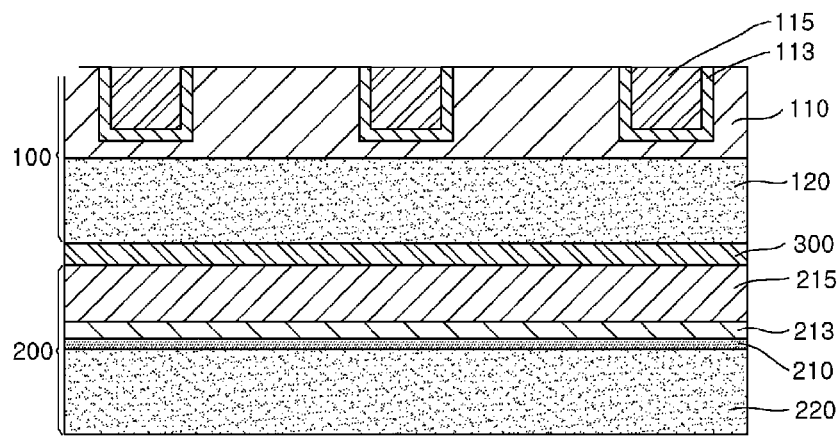
Figure 4:
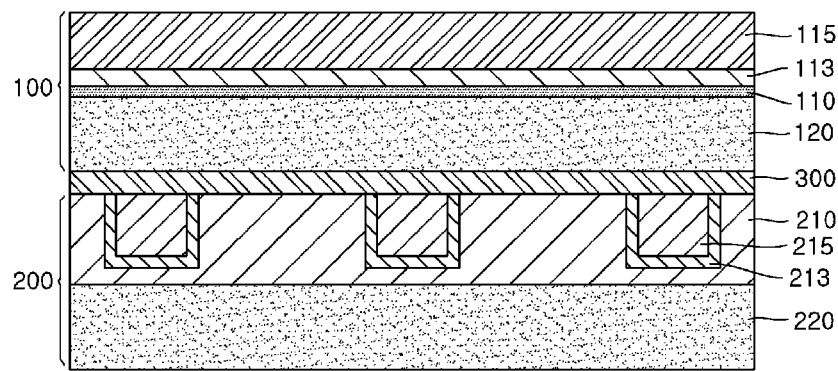
Figure 5:
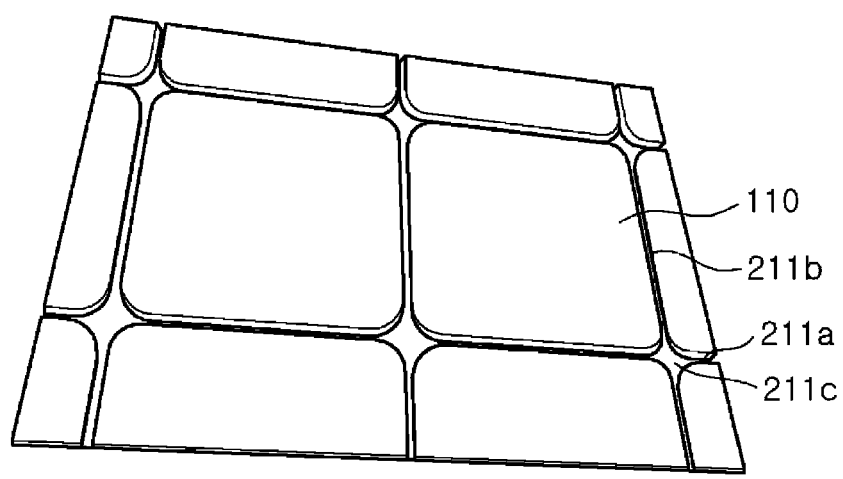
FIG. 5 shows a part of intaglio that is formed on a resin layer, in which the intaglio will be filled with sensing electrodes.

FIG. 2a and FIG. 2b are plan views of a first sensing layer including a x-axis sensing electrode of an upper layer of a touch panel according to an embodiment of the present invention and of a second sensing layer including a y-axis sensing electrode of a lower layer of the touch panel, respectively. FIG. 3 is a cross-sectional view along with a line A-A' of FIG. 2a and FIG. 4 is a cross-sectional view along with a line B-B' of FIG. 2a. FIG. 5 shows a part of intaglio that is formed on a resin layer, in which the intaglio will be filled with sensing electrodes.

Referring to FIG. 2a to FIG. 4, the touch panel 10 according to an embodiment of the present invention is composed of a first sensing layer 100 including a plurality of first direction sensing electrodes 115 which are patterned and a plurality of first wiring electrodes 140, and a second sensing layer 200 including a plurality of second direction sensing electrodes 215 which are patterned and a plurality of second wiring electrodes 240. Here, the plurality of the first wiring electrodes 140 and the plurality of the second wiring electrodes 240 are described in detail in FIG. 9. The first sensing layer 100 and the second sensing layer 200 are formed by mutually bonding their broad sides in a vertical direction. One ends of the first direction sensing electrodes 115 are connected to the plurality of the first direction sensing electrodes lines D1 L1, 2, 3 . . . , and one ends of the second direction sensing electrodes 215 are connected to the plurality of the second direction sensing electrodes lines D2L1, 2, 3 . . . .

Here, the number of the plurality of the first and second directions sensing electrodes and the plurality of the first and second directions sensing electrodes lines may be determined widely and variously according to the uses of the touch panel.

For the embodiments, the first sensing layer 100 is the upper layer and the second sensing layer 200 is the lower layer. That is, the second sensing layer is firstly formed and the first sensing layer is formed on the second sensing layer. In this situation, the material, such as an adhesive, for example, OCA (Optical Clear Adhesive), and the like, which has an adhesive property, is included on the bottom part of the first sensing layer 100 without a separate bonding layer so that the first sensing layer is preferably bonded to the upper part of the second sensing layer 200.

However, when it is possible to bond the first sensing layer 100 and the second sensing layer 200 by forming the separate bonding layer 300 therebetween, the bonding layer 300 in this situation is preferably Optical Clear Adhesive of a film type. In the case of using the separate bonding layer 300 as mentioned above, it is of great advantage in terms of insulating aspect.

In addition, the touch panel may be formed by bonding any one of the sensing layers with the upper part or the bottom part of the other sensing layer after forming the first and second sensing layers at the same time.

Each of the first direction sensing electrode 115 and the second direction sensing layer 215 is located on the first sensing layer 100 and the second sensing layer 200 to mutually cross in a space. For example, the first direction sensing electrodes may be formed in a widthwise direction on the first sensing layer and the second direction sensing electrodes may be formed in a lengthwise direction on the second sensing layer.

The first direction sensing electrodes are formed in a plurality of first regions R1 for sensing object's touch and a plurality of second regions R2 for connecting the first regions on the surface of the touch panel 10. The second direction sensing electrodes include a plurality of first regions R3 and a plurality of second regions R4, which have the same shape as the plurality of the first regions R1 and the plurality of the second regions R2, except in that the first regions R1 is formed in the lengthwise direction and the second regions R2 is formed in the widthwise direction on the first sensing layer.

However, the first regions R1 of the first sensing layer sense positional information of a horizontal axis, but the first regions R3 of the second sensing layer performs the operation for sensing positional information of a vertical axis. Therefore, the touch point can be correctly found on the touch panel 10.

The plurality of the first regions R1, R3 are preferably formed more broadly as compared with the plurality of the second regions R2, R4 for easily sensing the object that is touched on the surface of the touch panel.

The plurality of the first regions R1, R3 and the plurality of the second regions R2, R4 may be formed to surround their edges by edge electrodes 115c. The plurality of the first regions R1 has various shapes, such as diamonds, hexagon, and the like, and sensing electrodes having a lattice shape form inside the regions. That is, as shown in FIG. 2a and FIG. 2b, a plurality of sensing electrodes 115a in a widthwise direction and a plurality of sensing electrode 115b in a lengthwise direction may be formed to cross mutually so that the first regions R1, R3 may be formed in a lattice shape.

As shown in FIG. 5, a crossing region 211c between an intaglio region 211a to be filled with widthwise direction electrodes and an intaglio region 211b to be filled with lengthwise direction electrodes among the electrodes composing the sensing electrodes is formed a little bit broadly than non-crossing regions 211a, 211b.

Preferably, the plurality of the first regions R1, R3 may not be overlapped mutually in a vertical direction of the first and second sensing layers and the plurality of the second regions R2, R4 may be overlapped in a vertical direction with the second region of the first sensing layer and the second region of the second sensing layer.

As other embodiment, each pattern of the second region R2 of the first sensing layer and the second region R4 of the second sensing layer may be formed in a different pattern from each pattern of the first region of the first sensing layer and the first region of the second sensing layer. At this situation, the pattern formed by vertically overlapping the second region R2 of the first sensing layer and the second region R4 of the second sensing layer may preferably be formed to be the same or similar with the pattern of the first region of the first sensing layer or the pattern of the first region of the second sensing layer.

An optical transmittance of the sensing layer can be improved by forming the sensing electrodes in a lattice shape of widthwise direction and lengthwise direction on the first sensing layer and the second sensing layer. In addition, the ends of the plurality of sensing electrodes 115b, 215a of lengthwise direction and the sensing electrodes 115a, 215b of widthwise direction are connected to edge electrodes 115c, 215c thereby preventing an increase of resistance capacity of the first regions R1, R3 so that a sufficient amount of current can be flowed into the first and second sensing electrodes of the first and second layers and then finally a touch sensitivity of the touch panel can be improved.

The first region R1 of the first sensing layer 100 and the first region R3 of the second sensing layer 200 are arranged to not overlap mutually in a vertical direction of the first and second sensing layers. Looking the touch panel 10 down from the first sensing layer 100 that is the upper layer, the first region R1 of the first sensing layer 100 is projected onto the region 110 on which any sensing electrode on the second sensing layer 200 is not formed.

Referring to FIG. 3 and FIG. 4, and the sections on A-A' and B-B' of the touch panel 10 of FIGS. 2a and 2b, the resin layers 110, 210 including the patterned layers on the transparent substrate 120 are laminated on the first sensing layer 100 and the second sensing layer 200 and an intaglio is formed inside thereof. The intaglio includes the seed layers 113, 213 and a metal layer for forming the sensing electrodes 115, 215 and the wiring electrodes 140, 240 inside thereof. The intaglio according to the present embodiment does not penetrate to the transparent substrate because the resin layers 110, 210 are still remained in the bottom part. In addition, the first sensing layer 100 and the second sensing layer 200 are bonded by the bonding layer 300.

Here, the patterned layer means the region formed with the intaglio on the resin layer according to the pattern of the sensing electrodes.

Figure 6:
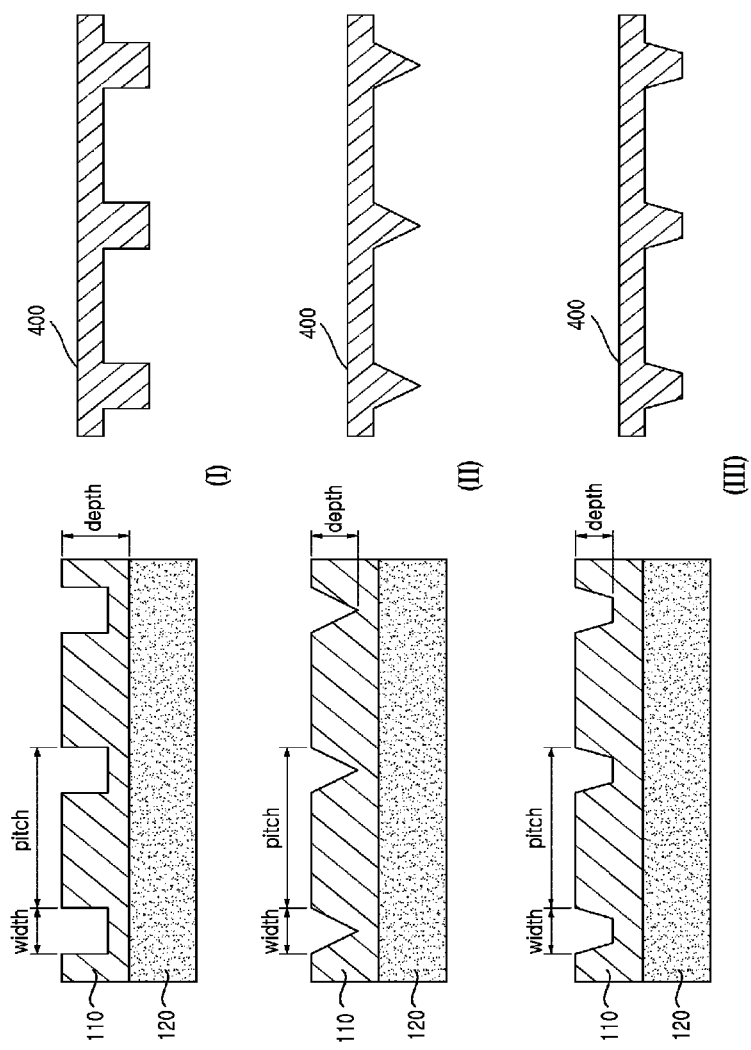
FIG. 6 shows shapes of intaglio that are formed by molds having various shapes and relevant molds that are used for forming the intaglio on the patterned layer.
Figure 7:
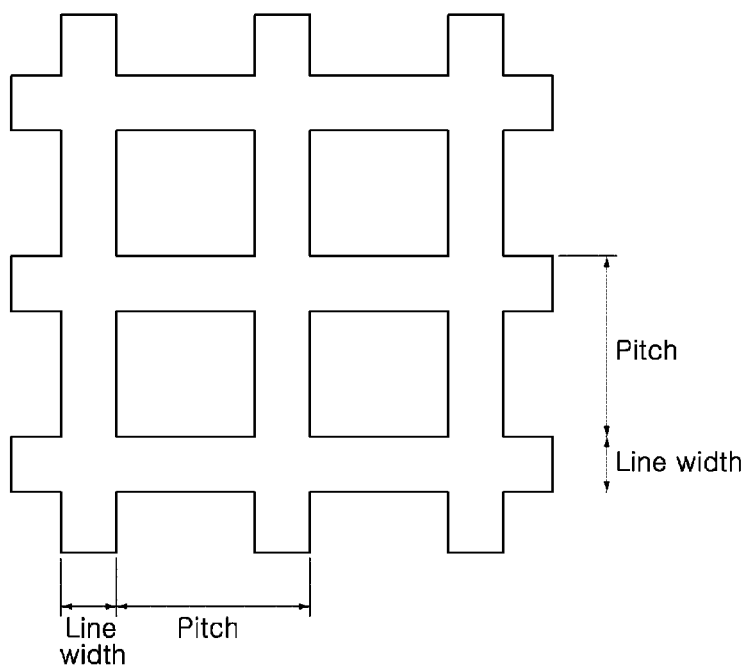
FIG. 7 is a plan view of the patterned layer formed on the intaglio formed by a mold having a square shape.

FIG. 6 shows cross-sectional shapes of intaglio that are formed by molds having various shapes and relevant molds that are used for forming the intaglio on the patterned layer, and FIG. 7 is a plan view of the patterned layer on the intaglio that is formed by a mold having a square shape.

Referring to FIG. 6, the cross-section of the intaglio to be formed with the sensing electrodes on the resin layer 110 laminated on the transparent substrate 120 and the mold 400 forming the intaglio are shown. For example, the cross-section of the intaglio may be a square, a triangle, and a diamond shapes. Even though the intaglio has various shapes, the width of the intaglio and the pitch that is an interval between the intaglios for forming a lattice pattern should have the value within a certain range as disclosed in Table 1 so that Fill Factor can be obtained. The depth of the intaglio may be formed to have the same height with the height of the resin layer to be formed, but a part of resin layer is still remained on the floor surface of the intaglio so that the surface of the transparent substrate and the metal layer should not preferably be contacted.

Referring to FIG. 7 and Equation 1, the Fill Factor is defined as a ratio dividing the area of a lattice shape that is formed on one sensing layer by the area of the conductive layer, and is presented by the following Equation 1:

$$\text{Fill Factor} = 100\% - \left[\left[\frac{(\text{Horizontal Pitch} - \text{Line Width}) \times (\text{Vertical Pitch} - \text{Line Width})}{(\text{Horizontal Pitch} \times \text{Vertical Pitch})}\right] \times 100\right] \quad [\text{Equation 1}]$$

When the Fill Factor as defined above is less than 1.4, the optical transmittance is increased but the touch motion is possible to not smoothly perform due to the decrease of the contact area for capacitance and the increase of resistance of the conductive layer; and when the fill factor is above 10, there are disadvantages such that the pattern of the sensing electrodes is sighted and the transmittance is decreased due to the increase of the area of the conductive layer.

Therefore, the Fill Factor preferably has the value between 1.4~7.0%, and the line width of the sensing electrodes and the pitch are preferably used by adjusting properly according to the value of the Fill Factor.

TABLE 1

| Line Width (μm) | Pitch (μm) | Fill Factor (%) |
| --- | --- | --- |
| 1~5 | 100 | 1.9~10 |
|  | 200 | 2.5~5.0 |
|  | 300 | 1.9~3.5 |
|  | 400 | 1.4~2.5 |
|  | 500 | 0.4~1.9 |
|  | 600 | 0.3~1.7 |
| 6~10 | 100 | 11~19 |
|  | 200 | 5.9~10 |
|  | 300 | 3.9~7.0 |
|  | 400 | 2.9~5.0 |
|  | 500 | 2.3~3.9 |
|  | 600 | 1.9~3.3 |

Figure 8A:
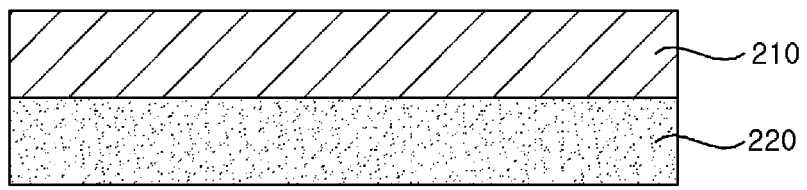
FIG. 8a to FIG. 8f show a process for forming sensing electrodes when the cross-section of the intaglio is a square in any sensing layer of a touch panel according to an embodiment of the present invention.
Figure 8B:
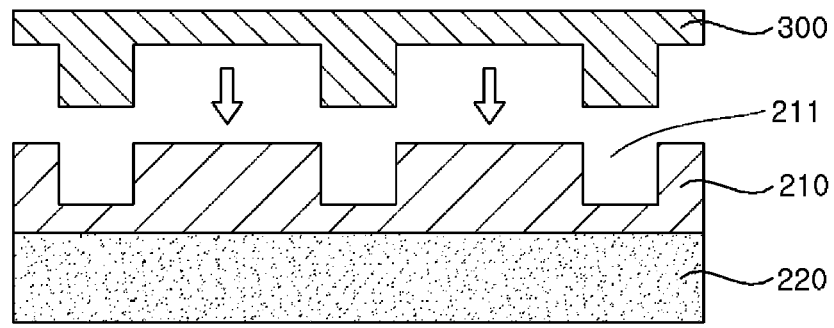
Figure 9:
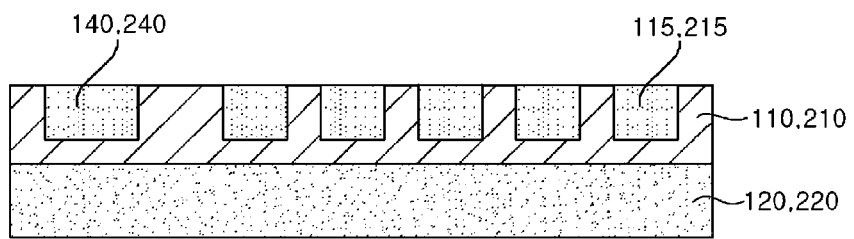
FIG. 9 is a cross-sectional view along with a line C-C' of FIG. 2a, showing the sensing electrodes and the wiring electrodes together formed on the edge of the sensing layer.
Figure 10:
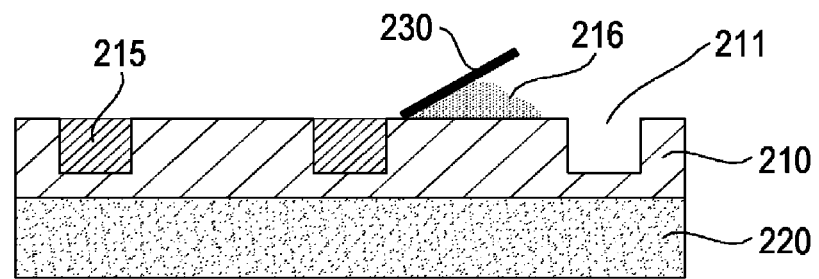
FIG. 10 shows a process for removing a metallic material or a conductive polymer remained on the surface of the patterned layer except the sensing electrodes after coating the metallic material or the conductive polymer without a seed layer in the intaglio.
Figure 13:
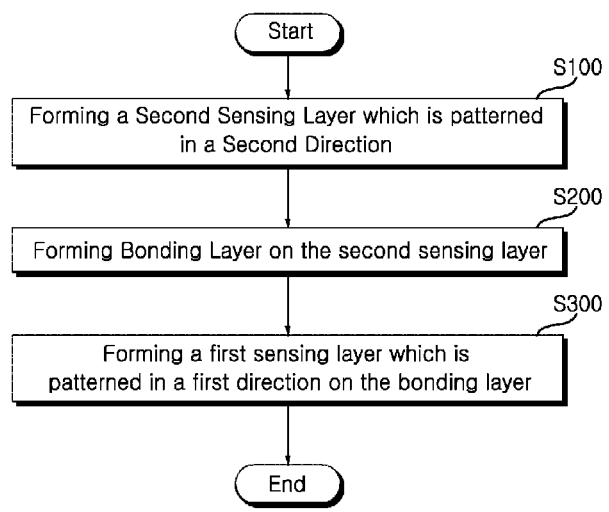
FIG. 13 is a flow chart of method for manufacturing the touch panel according to an embodiment of the present invention.

FIG. 8a to FIG. 8f show a process for forming sensing electrodes when the cross-section of the intaglio is a square in any sensing layer of a touch panel according an embodiment of the present invention; FIG. 9 shows the sensing electrodes and the wiring electrodes together that are formed on the edge of the sensing layer; and FIG. 10 shows a process for removing the metallic material and the conductive polymer remained on the surface of the patterned layer except the sensing electrodes after coating the metallic material or the conductive polymer without the seed layer in the intaglio. FIG. 13 is a flow chart of method for manufacturing a touch panel according to an embodiment of the present invention; and FIG. 14 is a flow chart of a process for forming the sensing layer of FIG. 13.

Figure 14:
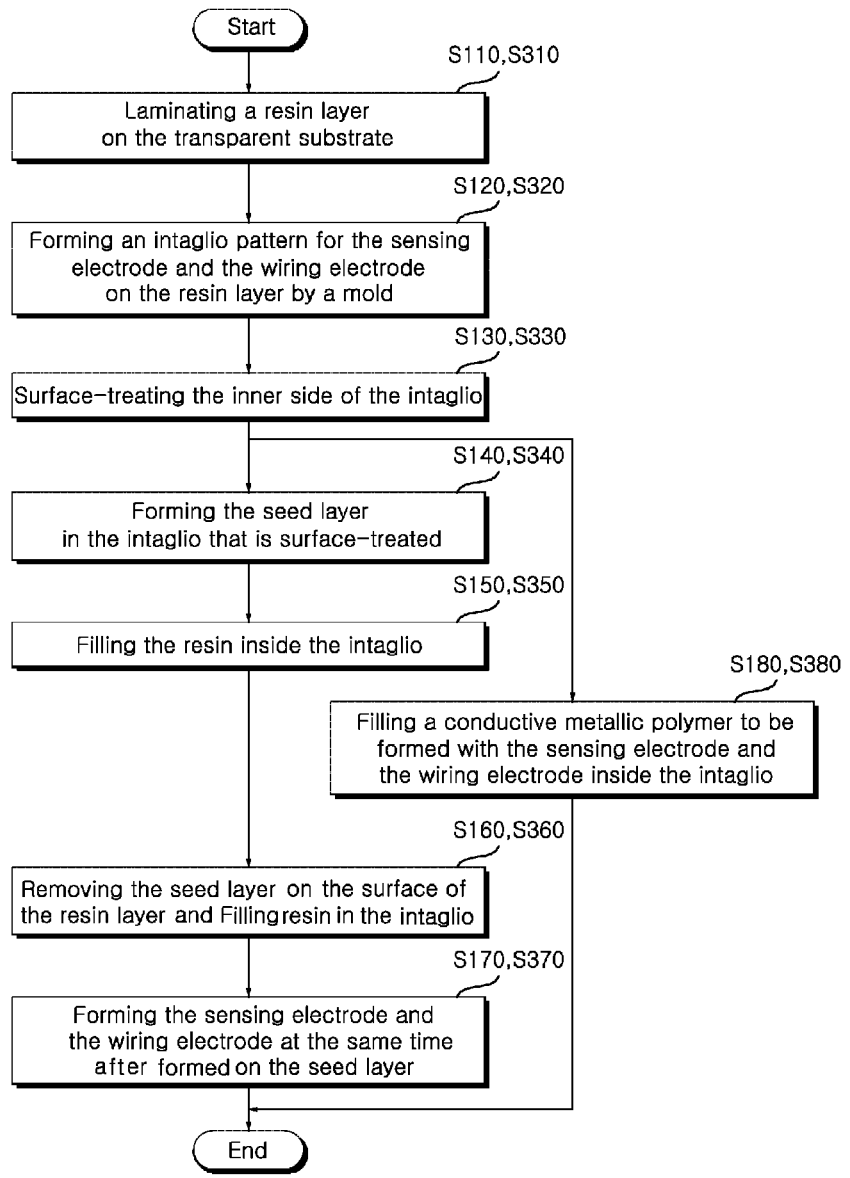
FIG. 14 is a flow chart of a process for forming the sensing layer of FIG. 13.

Firstly, referring to FIG. 13 to FIG. 14, according to the method for manufacturing the touch panel according to the embodiment of the present invention, the touch panel that is composed of the sensing layers is produced by the method comprising: forming the second sensing layer having the second sensing electrodes that are patterned in a second direction (S100); forming the bonding layer that is an adhesive (OCA) for bonding the first sensing layer on the surface of the second sensing layer (S200); and forming the first sensing layer having the first sensing electrodes that are patterned in a first direction on the surface of the bonding layer.

The adhesive is a film type, and preferably allows to bond the first and second sensing layers by laminating between the first sensing layer and the second sensing layer.

For another embodiment, the first sensing layer and the second sensing layer may be mutually bonded by including an adhesion material on the lower side of the upper layer. That is, any one sensing layer from the first and second sensing layers includes the material having an adhesion on the lower part thereof thereby having a role as the bonding layer without a separate bonding layer so that the thickness of the touch panel can be decreased.

For the present embodiment, the first sensing layer and the second sensing layer are formed through the same process. Referring to FIG. 8a to FIG. 8f, the process for forming the sensing layer will be described in detail based on the second sensing layer.

Referring to FIG. 8a to FIG. 8f, the resin layer 210 is laminated on the transparent substrate 220 (S110, S310). The resin film or glass can be used as the transparent substrate 220.

When using the resin film, a thermoplastic resin, such as polyethyleneterephthalate (PET), polycarbonate (PC), polymethylmetharylate (PMMA), triacetate cellulose (TAC), polyethersulfone (PES), and the like, can be used; its thickness is suitably the range of 25~250 μm; and the optical transmittance is suitably above 80%, more preferably above 90%. When using the resin film as the transparent substrate, the material including an adhesive, such as PSA (Pressure Sensitive Adhesive) can be used.

UV curing resin or thermo-setting resin can be used as the resin layer 210. And then, as shown in FIG. 8b, the intaglio 211 is formed by imprinting the mold 400 on the resin layer 210. The intaglio 211 is formed according to the pattern to be formed with the plurality of the first and second direction sensing electrodes and the plurality of the first and second wiring electrodes (S120, S320). When UV curing resin or thermo-setting resin is used as the material for the resin layer 210, the intaglio 211 may be formed by curing the resin layer 210 through giving UV or heat in a state of pressing the mold 400 on the resin material before curing the resin material, and then removing the mold 400 after curing the resin material.

At this time, an embossed mold 300 is used for forming the intaglio on the resin layer 210, and is preferably the material having a quality of a sufficiently lower surface roughness. After pattering the intaglio according to the mold, it is preferable to have Haze of less than 4%.

As shown in FIG. 8b, a pattern type of the intaglio formed on the resin layer 210 according to the present embodiment is a square, but the cross-sectional shapes of the intaglio having various patterns can be obtained by using the molds having various shapes as shown in FIG. 6. The pattern size of the intaglio formed on the resin layer 210 can be different according to the embodiments, but it preferably is that the line width of the electrode is 1 μm~10 μm, the depth of the electrode is 1 μm~10 μm, and the pitch between of the electrodes is 200 μm~600 μm.

Figure 8C:
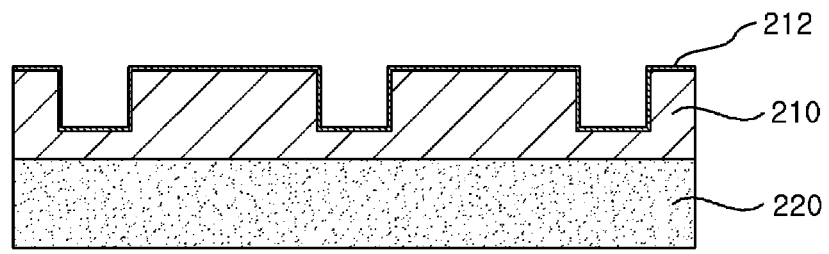

And then, the internal surface of the intaglio 211 and the surface of the resin layer 210 are preferably surface-treated in order to improve an adhesive property between the resin layer 210 and the seed layer 213 to be formed in the subsequent process, and the part that is surface-treated may be marked as the surface-treated layer 212 as shown in FIG. 8c (S130, S330). A method for surface-treating may include a chemical etching using alkali-based aqueous solution or catalyst treatments, and plasma or ion beam treatments, and the like.

Figure 8D:
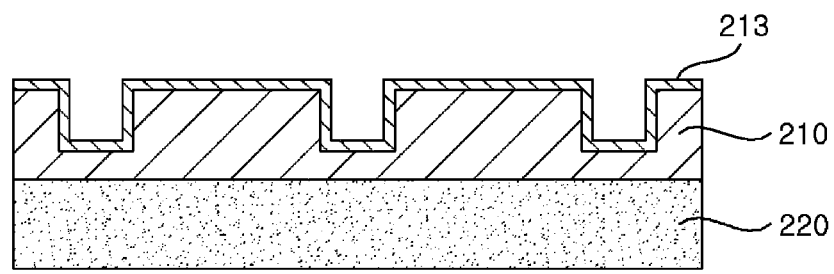

And then, as shown in FIG. 8d, the metallic seed layer 213 is formed on the surface-treated layer 212 (S140, S340). The seed layer 213 may be formed by using an electroless plating, CVD deposition, sputtering or printing using a metal material. The material for the seed layer may include any one of copper (Cu), nickel (Ni), chromium (Cr), iron (Fe), tungsten (W), phosphorus (P), cobalt (Co), silver (Ag), silver-carbon (Ag—C), nickel-phosphorus (Ni—P), copper oxide II (CuO), and inorganic matter ($SiO_2$), or alloy thereof; and its thickness preferably is 0.01 μm~5 μm.

Figure 8E:
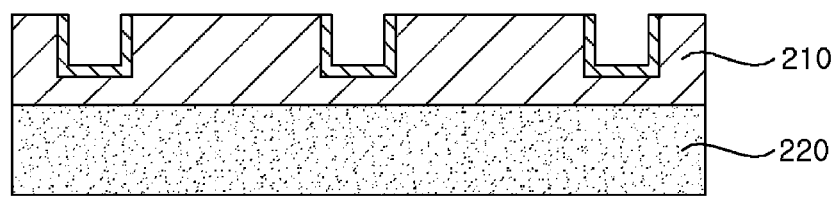

Referring to FIG. 8e, the process for removing the seed layer 213 from the surface of the resin layer other than the patterned region of the intaglio includes selectively removing (S160, S360) the resin that is filled inside the intaglio and the seed layer formed on the surface of the resin layer by depositing in an etching solution after filling (S150, S350) with the resin having an etch resistance inside the intaglio that is the patterned region. In this situation, a chemical used for the etching includes any one of a type of nitric acid, a type of sulfuric acid, a type of hydrochloric acid, a type of copper sulphate, ferric chloride, and copper chloride.

Figure 8F:
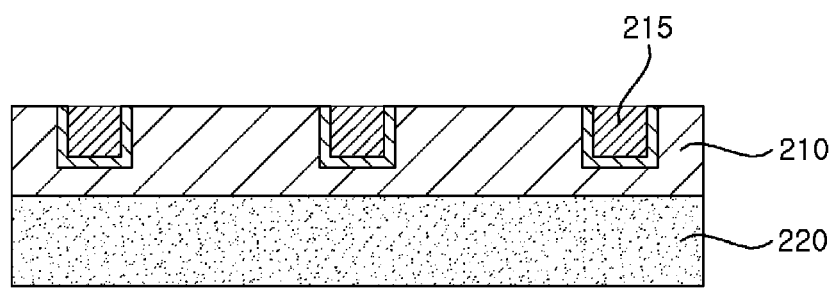

Referring to FIG. 8f, the sensing electrodes 215 and the wiring electrodes 240 may be formed by an electroless plating, an electro plating, CVD deposition, sputtering, coating or printing on the seed layer 213 (S170, S370). The sensing electrodes and the wiring electrodes are formed at the same time, and preferably by using the material having a lower resistance than ITO (Indume Tin Oxide). Especially, any one of copper (Cu), silver (Ag), silver-carbon (Ag—C), aluminum (Al), nickel (Ni), chromium (Cr), and nickel-phosphorus (Ni—P), or alloy thereof can be used as the raw material for the sensing electrode 215 and the wiring electrode 240.

Referring to FIG. 9, each of the first and second wiring electrodes 140, 240 may be formed at the same time with each of the first and second direction sensing electrodes on the part of edge of each of the first and second sensing layers in a broader width than the width of each of the first and second direction sensing electrodes.

Referring to FIG. 10, as other embodiment, the sensing layer may be formed by wiping or scratching with a blade 230 on the surface to be free of residue after coating the metallic material or conductive polymer without the metallic seed layer on the patterned layer (S180, S380). In this situation, the conductive polymer coated on the surface of the patterned layer has a thickness of 1 μm~10 μm. The height of the metal layer filled on the intaglio pattern of the resin layer 210 is preferably the same or lower than the depth of the intaglio pattern formed on the resin layer 210.

The pattern of the sensing electrodes of the touch panel is only an embodiment, but a plurality of the sensing electrodes that perform the functions of sensing and operating of the touch may be patterned in various structures and then applied. The pattern of the sensing electrode as mentioned above relates to the Fill Factor that is calculated as a ratio of the area the patterned layer formed with the sensing electrodes to the area of the sensing electrodes, and the Fill Factor of the touch panel according to the present embodiment is disclosed in Table 1.

Figure 11:
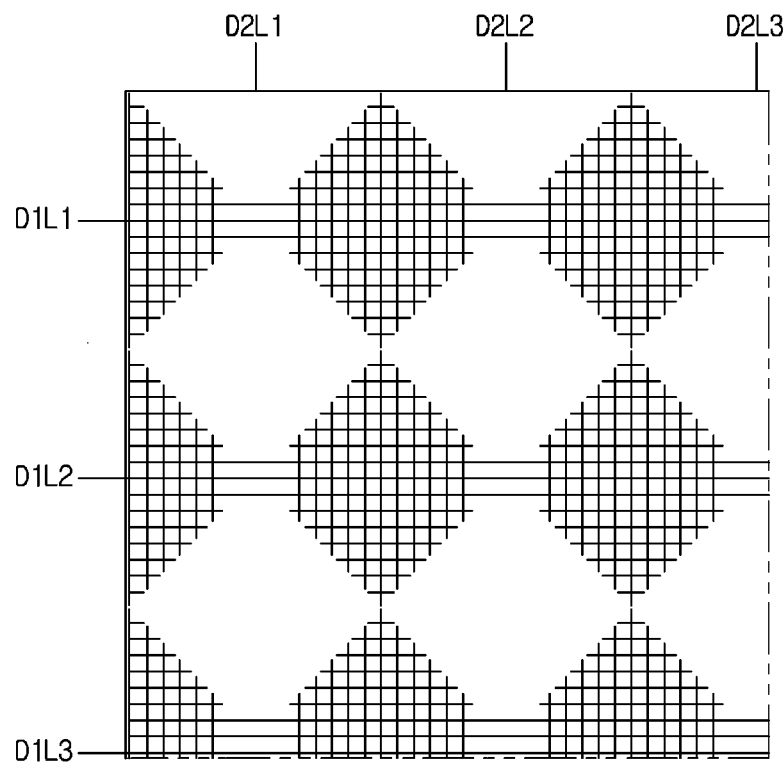
FIG. 11 is a plan view of any sensing layer having the sensing electrodes that are formed on the touch panel according to another embodiment of the present invention.

FIG. 11 is a plan view of any sensing layer having the sensing electrodes that are formed on the touch panel according to another embodiment of the present invention, and FIG.

12 is a plan view of sensing electrodes that are formed on the touch panel according another embodiment of the present invention.

FIG. 11 is an embodiment applied with the structure of a minimized sight clearance by removing the edge electrode formed outside of the sensing and operating regions of the sensing electrodes of FIG. 2a and FIG. 2b, and even in this situation, the Fill Factor in the cross region between the widthwise sensing electrode and the lengthwide sensing electrode formed on the same sensing layer is the same with Table 1.

Figure 12:
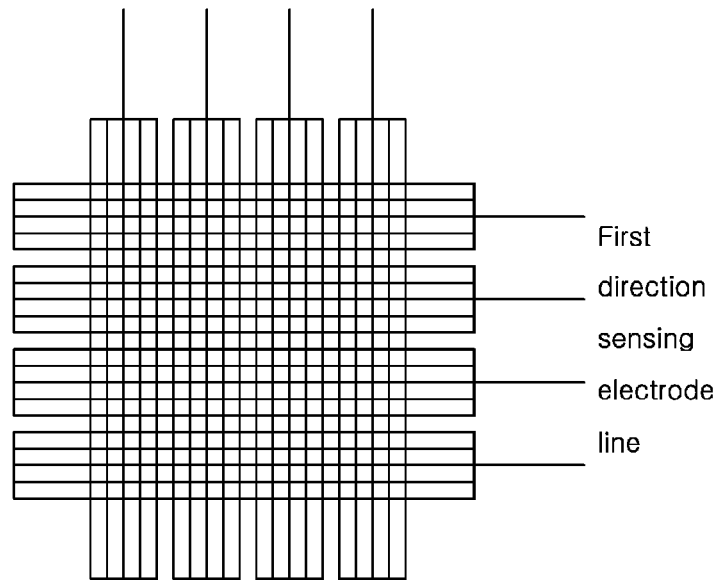
FIG. 12 is a plan view of sensing electrodes that are formed on the touch panel according another embodiment of the present invention.

FIG. 12 shows a plurality of fine sensing electrodes in a vertical or horizontal direction on each sensing layer, and the sensing electrodes on the different sensing layer each other on the plan view of the touch panel are displayed in a lattice shape that are intersected in X and Y axis. In this situation, the Fill Factor on the part in which the sensing electrode lines are intersected in X and Y-axis is the same with Table 1. The above structure has an advantage structure in terms of the sight clearance of the sensing electrodes as compared with the shape of the sensing electrodes having the edge electrodes as disclosed in FIG. 2a and FIG. 2b.

With the above method, the sensing electrode may have various Fill Factors for the line width and pitch of the sensing electrodes, and also the sensing electrodes can be composed in various shapes of their section, such as a square, a pentagon, a hexagon, an oval, and the like.

The capacitive touch panel and method for manufacturing the same according to the present embodiment can provide the touch panel having various Fill Factors that are formed with the conductive layer having a low resistance as compared with ITO on the intaglio after a fine pattern of the intaglio applied with the imprinting process, thereby improving the touch sensitivity and performance and also making a large area.

The capacitive touch panel and method for manufacturing the same according to the present embodiment can improve the optical transmittance that can be limited due to the sensing electrode and also the sight clearance by arranging the sensing electrode in a lattice shape.

The capacitive touch panel and method for manufacturing the same according to the present embodiment can provide an excellent durability by preventing an exposure of the electrode part by forming the electrode part on the intaglio.

The capacitive touch panel and method for manufacturing the same according to the present embodiment can reduce the time and the process for manufacturing, and also increase productivity and reduce the cost for manufacturing by forming the sensing electrode and the wiring electrode at the same time on the intaglio of the fine pattern formed on the resin layer.

The above explanation is only for illustrating by example of the technical spirit of the present invention, and the person who has a general skill in the art can modify, amend and substitute variously within the range of the essential features of the present invention. Therefore, the embodiments disclosed in the present invention and the accompanying figures are for illustrating, not limiting the technique spirit, and the range of the technical spirit of the present invention will not be limited according to the embodiments and the accompanying figures. The protection range of the present invention should be interpreted according to the following Claims, and all of the technical spirits within the same range with the same should be interpreted to be contained in the right range of the present invention.

The invention claimed is:

1. A capacitive touch panel, comprising:
   a first sensing layer including a plurality of first direction sensing electrodes and a plurality of first wiring electrodes; and
   a second sensing layer including a plurality of second direction sensing electrodes and a plurality of second wiring electrodes,
   wherein the first sensing layer and the second sensing layer are stacked in a vertical direction,
   wherein the plurality of the first direction sensing electrodes are disposed in a plurality of first regions and a plurality of second regions of the first sensing layer, the first regions sensing a position of a touch in a first direction, the second regions each disposed between neighboring first regions, at least one of the first direction sensing electrodes having an end that is electrically open such that the plurality of the first direction sensing electrodes have lattice shapes in the plurality of the first regions,
   wherein the plurality of the second direction sensing electrodes are disposed in a plurality of third regions and a plurality of fourth regions of the second sensing layer, the third regions sensing the position of the touch in a second direction, the fourth regions each disposed between neighboring third regions,
   wherein the first direction sensing electrodes include a first plurality of line electrodes extending in the first direction and a second plurality of line electrodes extending in the second direction, and
   wherein the first plurality of line electrodes include one or more line electrodes each having two ends that are electrically open, and the second plurality of line electrodes include one or more line electrodes each having two ends that are electrically open.

2. The capacitive touch panel according to claim 1, wherein the first regions of the first sensing layer and the third regions of the second sensing layer do not overlap in the vertical direction.

3. The capacitive touch panel according to claim 1, wherein the second regions of the first sensing layer and the fourth regions of the second sensing layer overlap in the vertical direction.

4. The capacitive touch panel according to claim 3, wherein the second regions of the first sensing layer are arranged in a pattern different from that of the first regions of the first sensing layer, and
   wherein the fourth regions of the second sensing layer are arranged in a pattern different from that of the third regions of the second sensing layer.

5. The capacitive touch panel according to claim 3, wherein a pattern formed by overlapping the second regions of the first sensing layer and the fourth regions of the second sensing layer in the vertical direction is substantially the same as a pattern of the first regions of the first sensing layer or a pattern of the third regions of the second sensing layer.

6. The capacitive touch panel according to claim 1, wherein the touch panel further includes a bonding layer that is disposed between the first sensing layer and the second sensing layer, the bonding layer comprised of an optically clear adhesive of a film type.

7. The capacitive touch panel according to claim 1, wherein each of the first sensing layer and the second sensing layer includes:

a transparent substrate, and a resin layer disposed over the transparent substrate, wherein a patterned layer that has a plurality of grooves in the form of an intaglio is disposed over a surface of the resin layer.

8. The capacitive touch panel according to claim 7, wherein the first and second direction sensing electrodes and the first and second wiring electrodes are disposed inside the grooves in the form of the intaglio.

9. The capacitive touch panel according to claim 7, wherein a cross-sectional shape of the grooves is any of a square, a triangle, and a trapezoid.

10. The capacitive touch panel according to claim 7, wherein each of the grooves in the form of the intaglio has a width of 1 μm~10 μm, a depth of 1 μm~10 μm, and a pitch of 200 μm~600 μm.

11. The capacitive touch panel according to claim 7, wherein a seed layer of metal is disposed on the surface of the resin layer.

12. The capacitive touch panel according to claim 11, wherein the seed layer includes any of Cu, Ni, Cr, Fe, W, P, Co, Ag, Ag—C, Ni—P, CuO, SiO2, or an alloy thereof.

13. The capacitive touch panel according to claim 11, wherein the first and second direction sensing electrodes and the first and second wiring electrodes include a material having a lower resistance value than that of Indium Tin Oxide (ITO).

14. The capacitive touch panel according to claim 13, wherein the first and second direction sensing electrodes and the first and second wiring electrodes include any one of Cu, Ag, Ag—C, Al, Ni, Cr, Ni—P, and an alloy thereof.

15. The capacitive touch panel according to claim 7, wherein the touch panel has an optical transmittance of above 80% and a haze of less than 4%.

16. The capacitive touch panel according to claim 1, wherein each of the first wiring electrodes is disposed at a first edge portion of the first sensing layer and each of the second wiring electrodes is at a second edge portion of the second sensing layer, and wherein two neighboring first wiring electrodes and second wiring electrodes are disposed at a wider interval than that of two neighboring first and second direction sensing electrodes, respectively.

* * * * *